United States Patent Office.

WILLIAM GEORGE WHITE, OF ANERLEY, COUNTY OF SURREY, AND ROBERT ALFRED ALBERT WHITE, OF CRAYFORD, COUNTY OF KENT, ENGLAND.

COMPOSITION FOR POLYCHROMATIC-PRINTING BLOCKS.

SPECIFICATION forming part of Letters Patent No. 388,099, dated August 21, 1888.

Application filed February 21, 1888. Serial No. 264,838. (No specimens.)

*To all whom it may concern:*

Be it known that we, WILLIAM GEORGE WHITE, residing at Thurlow House, Weighton Road, Anerley, in the county of Surrey, England, engineer, and ROBERT ALFRED ALBERT WHITE, residing at Crayford, in the county of Kent, England, engineer, subjects of the Queen of Great Britain, have invented certain new and useful Polychromatic Printing, of which the following is a specification.

This invention relates to that system of color-printing known as the "polychromatic simultaneous" system, in which the printing-block is built up of suitably-prepared materials containing the various colors which the design requires, and in which the printing-block so built up of coloring materials imparts a portion of its own substance to the fabric or surface to which it is applied.

Our present invention relates to the preparation of coloring-matters for use, in the manner above set forth, in polychrome printing-blocks.

In order to produce fast colors, we take alizarine-blue and dissolve with a mordant of acetate of chrome; or galloflavine or anthracene-yellow and mix with a mordant of acetate of chrome and acetic acid; or alizarine-black and mix with a mordant of acetate of chrome and acetic acid; or corniliene-green and mix with a mordant of bisulphite of soda and acetate of chrome.

Anthracene-brown, chocolate, and alizarine-red do not require mordants to be mixed with them.

The above dyes are dried down in evaporating-pans, ground, and finally mixed in the following compound: ninety parts of petroleum jelly, one hundred and eighty parts of clear resin dissolved in spirits of turpentine, ninety parts of Gallipoli oil, and one hundred and eighty parts of mutton-fat. The above are heated separately, well mixed together, and after cooling are ready for use in the following proportions, say, one pound of coloring-matter to one and one-half pound of compound.

The colors already mentioned form the standard from which all other shades are made; but, being of great strength, we reduce by the introduction of china-clay into the compound in the proportions of one hundred and fifty pounds of compound to one hundred of china-clay mixed with two pounds of standard colors. The shades are worked into the required designs, the cloth is prepared with suitable mordants, if these are not present in the block, and is then printed, and finally steamed and finished in the mode already known to the trade.

What we claim is—

1. A mixture for blocks to be used in polychromatic printing, consisting of petroleum jelly, a solution of resin in turpentine, Gallipoli oil, fat, and a dye, substantially in the proportions described.

2. A mixture for blocks to be used in polychromatic printing, consisting of petroleum jelly, a solution of resin in turpentine, Gallipoli oil, fat, a dye, substantially in the proportions described, and a mordant.

WILLIAM GEORGE WHITE.
ROBERT ALFRED ALBERT WHITE.

Witnesses:
J. H. WORTHINGTON,
JNO. DEAN.